(12) United States Patent
Kun (10) Patent No.: US 9,637,327 B1
(45) Date of Patent: May 2, 2017

(54) METHOD AND APPARATUS FOR INTERMODAL CONTAINER HANDLING

(71) Applicant: SEA-TRAIN EXPRESS—LLC, Federal Way, WA (US)

(72) Inventor: David Kun, Federal Way, WA (US)

(73) Assignee: SEA-TRAIN EXPRESS—LLC, Federal Way, WA (US)

( * ) Notice: Subject to any disclaimer, the term of this patent is extended or adjusted under 35 U.S.C. 154(b) by 0 days.

(21) Appl. No.: 15/144,517

(22) Filed: May 2, 2016

(51) Int. Cl.
*B65G 63/00* (2006.01)
*B65G 19/22* (2006.01)
*B61D 3/00* (2006.01)

(52) U.S. Cl.
CPC ............. *B65G 63/004* (2013.01); *B61D 3/00* (2013.01); *B65G 19/225* (2013.01); *B65G 2201/0235* (2013.01)

(58) Field of Classification Search
CPC .................................................. B65G 63/004
USPC ........................................................ 414/333
See application file for complete search history.

(56) References Cited

U.S. PATENT DOCUMENTS

| | | | |
|---|---|---|---|
| 2,043,134 A | 6/1936 | Wanamaker | |
| 2,753,811 A | 7/1956 | Walker | |
| 2,826,155 A | 3/1958 | Larsson | |
| 2,855,115 A | 10/1958 | Casey | |
| 2,920,580 A | 1/1960 | Williams | |
| 2,933,053 A | 4/1960 | Mellam | |
| 3,012,524 A * | 12/1961 | Buisson ................ | B61D 3/184 410/65 |
| 3,016,025 A | 1/1962 | Deodat | |
| 3,130,688 A | 4/1964 | Gutridge et al. | |
| 3,307,722 A | 3/1967 | Godbille | |
| 3,442,404 A | 5/1969 | Pioch | |
| 3,550,796 A | 12/1970 | Walda | |
| 3,640,410 A | 2/1972 | Pioch | |
| 3,991,889 A | 11/1976 | Cox | |
| 4,124,129 A | 11/1978 | Barry | |

(Continued)

FOREIGN PATENT DOCUMENTS

| | | |
|---|---|---|
| CN | 201330353 Y | 10/2009 |
| EP | 0400052 B1 | 4/1995 |
| GB | 2270663 A | 3/1994 |

OTHER PUBLICATIONS

Ligang Zhang, et al, CN201330353 (Y) Oct. 21, 2009—Narrow Gage Cross-Over Switch Device. Espacenet, English machine translation (12 pages).

*Primary Examiner* — Jonathan Snelting
(74) *Attorney, Agent, or Firm* — R. Reams Goodloe, Jr.

(57) ABSTRACT

A rail-road intermodal freight system. In an embodiment, a conveyor system is provided for placing rail cars in a position for loading shipping containers thereon, while an over-the-road trailer is secured to the rail car. Rail cars have a frame with a front end and a rear end, and a bogie having at least four flanged rail wheels is pivotally mounted to the rear of the frame of the rail car. A method for unloading the rail cars includes lifting the front of the frame of the rail cars and pivoting the rail cars by an angle alpha from the track direction at an unloading area, and lowering the front end of the frame to the ground to allow truck access to trailers on the rail car. By utilizing the method, efficient loading and unloading of train involved in intermodal shipments may save considerable time, and thus reduce costs.

9 Claims, 9 Drawing Sheets

(56) References Cited

U.S. PATENT DOCUMENTS

| | | |
|---|---|---|
| 4,190,393 A | 2/1980 | Landow |
| 4,258,628 A | 3/1981 | Altherr |
| 4,274,776 A * | 6/1981 | Paton .................. B60P 3/07 |
| | | 105/199.3 |
| 4,425,064 A | 1/1984 | Walda et al. |
| 4,459,919 A | 7/1984 | Lemaire et al. |
| 4,480,554 A | 11/1984 | Brodeur et al. |
| 4,599,040 A | 7/1986 | Rasmussen |
| 4,638,740 A | 1/1987 | Rhodes |
| 4,644,869 A * | 2/1987 | Rhodes .................. B61K 7/02 |
| | | 104/172.2 |
| 4,685,399 A | 8/1987 | Baker |
| 4,686,907 A * | 8/1987 | Woollam .............. B61D 3/14 |
| | | 105/4.1 |
| 4,746,257 A | 5/1988 | Barry |
| 4,751,882 A | 6/1988 | Wheatley et al. |
| 4,792,269 A | 12/1988 | Engle |
| 4,817,537 A | 4/1989 | Cripe et al. |
| 4,867,468 A | 9/1989 | Paul et al. |
| 4,917,020 A | 4/1990 | Wicks et al. |
| 4,922,832 A | 5/1990 | Lienard et al. |
| 4,938,151 A | 7/1990 | Viens |
| 5,065,678 A | 11/1991 | Rhodes |
| 5,067,872 A | 11/1991 | Engle |
| 5,216,956 A | 6/1993 | Adams |
| 5,246,321 A | 9/1993 | Hesch |
| 5,249,532 A | 10/1993 | Perrot |
| 5,331,901 A | 7/1994 | Avery |
| 5,341,746 A | 8/1994 | Theurer et al. |
| 5,343,812 A | 9/1994 | Ishida |
| 5,368,152 A | 11/1994 | Rhodes |
| 5,421,687 A | 6/1995 | Wayman |
| 5,511,923 A | 4/1996 | Dunstan |
| 5,549,050 A * | 8/1996 | Rhodes ................... B61B 10/04 |
| | | 104/172.2 |
| 5,622,115 A | 4/1997 | Ehrlich et al. |
| 5,826,517 A | 10/1998 | Larson, Jr. et al. |
| 5,873,593 A | 2/1999 | Gesuale |
| 5,901,649 A | 5/1999 | Hathaway et al. |
| 5,988,073 A | 11/1999 | Eriksson |
| 6,240,853 B1 | 6/2001 | Kassab |
| 6,309,153 B1 | 10/2001 | Petzitillo, Jr. et al. |
| 6,330,953 B2 * | 12/2001 | Summa ................ B61B 10/022 |
| | | 104/172.3 |
| 6,352,400 B1 | 3/2002 | Forbes |
| 6,736,071 B2 | 5/2004 | Engle |
| 6,968,788 B1 | 11/2005 | Coslovi |
| 7,255,047 B1 * | 8/2007 | Coslovi .................. B61D 3/187 |
| | | 105/355 |
| 7,980,582 B2 | 7/2011 | Schuettenberg |
| 8,800,452 B2 * | 8/2014 | Kun ...................... B61D 3/184 |
| | | 104/130.01 |
| 9,096,239 B2 * | 8/2015 | Kun ...................... B61D 3/184 |
| 2003/0183119 A1 | 10/2003 | Hathaway et al. |
| 2004/0213652 A1 | 10/2004 | Campbell et al. |
| 2006/0260503 A1 | 11/2006 | Jeunehomme et al. |
| 2008/0129827 A1 | 6/2008 | Morino |
| 2008/0141895 A1 | 6/2008 | Lanigan et al. |
| 2008/0166211 A1 | 7/2008 | Lanigan et al. |
| 2008/0213073 A1 | 9/2008 | Benedict et al. |
| 2009/0003985 A1 | 1/2009 | Lanigan, Sr. et al. |
| 2009/0238669 A1 | 9/2009 | Hathaway et al. |
| 2009/0293756 A1 | 12/2009 | Hathaway et al. |
| 2010/0021257 A1 | 1/2010 | Hall et al. |

* cited by examiner

METHOD AND APPARATUS FOR INTERMODAL CONTAINER HANDLING

RELATED PATENT APPLICATIONS

None.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to a system for efficiently transferring containers, including unloading containers from ships and placing the same on rail cars, and to a system for unloading trailers from rail cars, and to apparatus which may be employed to facilitate such transfers.

BACKGROUND

In the freight shipping business, it is well known that in many situations, the transfer of containers from ship to rail may involve extra manpower and lost time while containers are first transferred to highway trailers, and thence to rail yards for organization, reloading, and connection of intercity trains. However, loading of containers on to highway capable trailers, and thence the loading of freight trailers on to rail cars, or alternately unloading the trailer and thence loading containers on to rail cars, is a rather labor intensive and time consuming activity. For example, highway trailers are often driven alongside of ships to a position for receiving a container from the ship. Then, the highway trailers may be moved to rail yard, where a switch engine may be used to position rail cars to a loading platform accessible to tractors for the trucks and the highway trailers on which the container was placed. As a result, the use of rail-to-road intermodal system methods have largely been limited to rather long distance freight hauls. However, in an ever more competitive shipping cost environment, there remains a need for improvements which would provide cost savings, and in particular, labor hour savings. More particularly, on "short" or "medium" haul lengths, say 200 to 400 miles, the use of rail systems might completely avoid the need for long haul truck drivers for large numbers of tractor-trailer combinations. Thus, the provision and use of a new ship-to-rail-to-road intermodal system would be desirable. Thus, it would be advantageous if novel, cost effective methods were available, along with novel apparatus for implementation of such methods, for improving economics of ship-to-rail-to road freight transfer.

BRIEF DESCRIPTION OF THE DRAWING FIGURES

The present invention will be described by way of exemplary embodiments, illustrated in the accompanying drawing figures in which like reference numerals denote like elements, and in which:

FIG. 3 depicts a conveyor system and accompanying rail siding which may be placed along a wharf for transfer of containers from a ship via a crane to an over-the-road trailer which is located on a rail car, the trailer configured for receiving and securing for transport one or more shipping containers, and the trailer adapted for use in a method of intermodal freight system handling. In this view it is seen that the guide wheels on the L-type rail car which support the forward end of individual L-type rail cars when traversing the rail siding have been raised above the rails by force of the pivot board acting on a cross-brace extending between the gear legs for the guide wheels; the forward movement of the rail car has ceased due to disengagement of the conveyor hook from the drag chain, and the rail car stays in place until removal of the pivot stop allows reengagement of the conveyor hook with the drag chain.

The foregoing figures, being merely exemplary, contain various elements that may be present or omitted from apparatus that may be used to practice the methods taught herein. An attempt has been made to draw the figures in a way that illustrates at least those elements that are significant for an understanding of the apparatus and methods taught herein, and for the alternate configurations thereof. However, various other elements for conveyor systems, and intermodal freight system components and methods of use thereof, may be utilized, within the teachings hereof and within the coverage of the claims set forth herein.

DETAILED DESCRIPTION

Unique equipment and methods for use of such equipment in ship-to-rail-to-road intermodal freight systems are set forth herein. Some of the equipment useful in carrying out the method(s) described herein was previously described in U.S. Pat. No. 8,800,452 B2, issued Aug. 12, 2014, to David KUN, and entitled Railroad Freight Car Loading or Unloading, the disclosure of which is incorporated herein in its entirety by this reference. The illustrations provided in this disclosure are directed at embodiments utilizing the most common trailer design seen in over-the-road applications in North America, namely, a semi-trailer. By definition, a semi-trailer is a trailer without a front axle. In semi-trailers, a large proportion of the weight in the semi-trailer is supported by an over-the-road tractor. Semi-trailers are normally equipped with landing gear, namely legs which can be lowered, to support the semi-trailer when it is detached from the over-the-road tractor. In many parts of the world, an over-the-road tractor coupled to a semi-trailer is known as a semi-trailer truck or more commonly, simply as a "semi". However, it should be understood that equipment and methods described herein may be applied to other types of trailers, including those having a front axle and attachment tongue and hitch, and thus the intermodal system design described herein should not be limited to semi-trailers per se, but should be understood to be useful in the quick loading and unloading of various over-the-road trailer designs.

Figure 1:
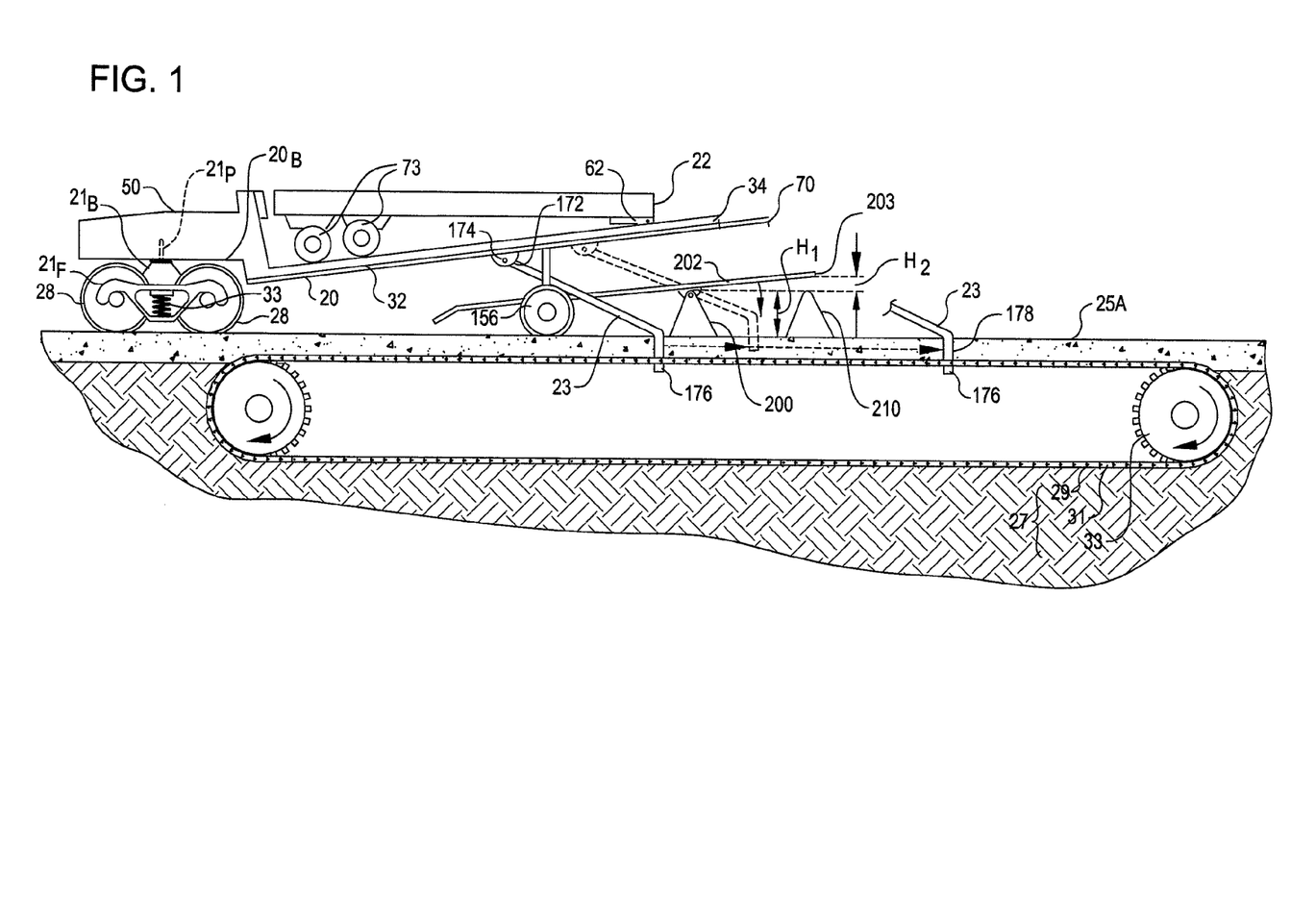
FIG. 1 shows a portion of a conveyor system and accompanying rail siding which may be placed along a wharf for transfer of containers from a ship to an over-the-road trailer which is located on an L-type rail car (also referred to herein as a "L-car" due to its lazy L shape), the trailer configured for receiving and securing for transport one or more shipping containers, and the trailer adapted for use in a method of intermodal freight system handling.
Figure 2:
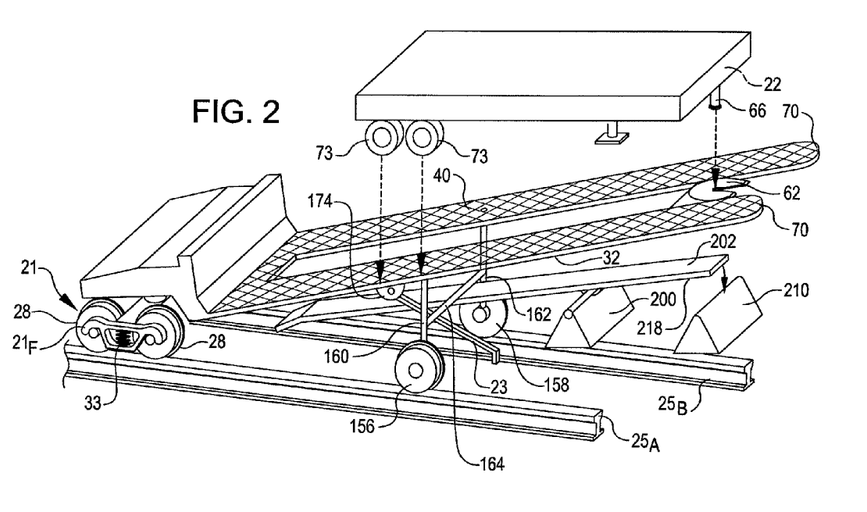
FIG. 2 shows yet further details for an embodiment of a L-type rail car for use in transport of over-the-road trailers, now illustrating the L-type rail car in empty configuration, ready for loading thereon of an over-the-road trailer thereon; the loading of the trailer may be accomplished before or after attaching the L-type rail car to the conveyor system.
Figure 3:
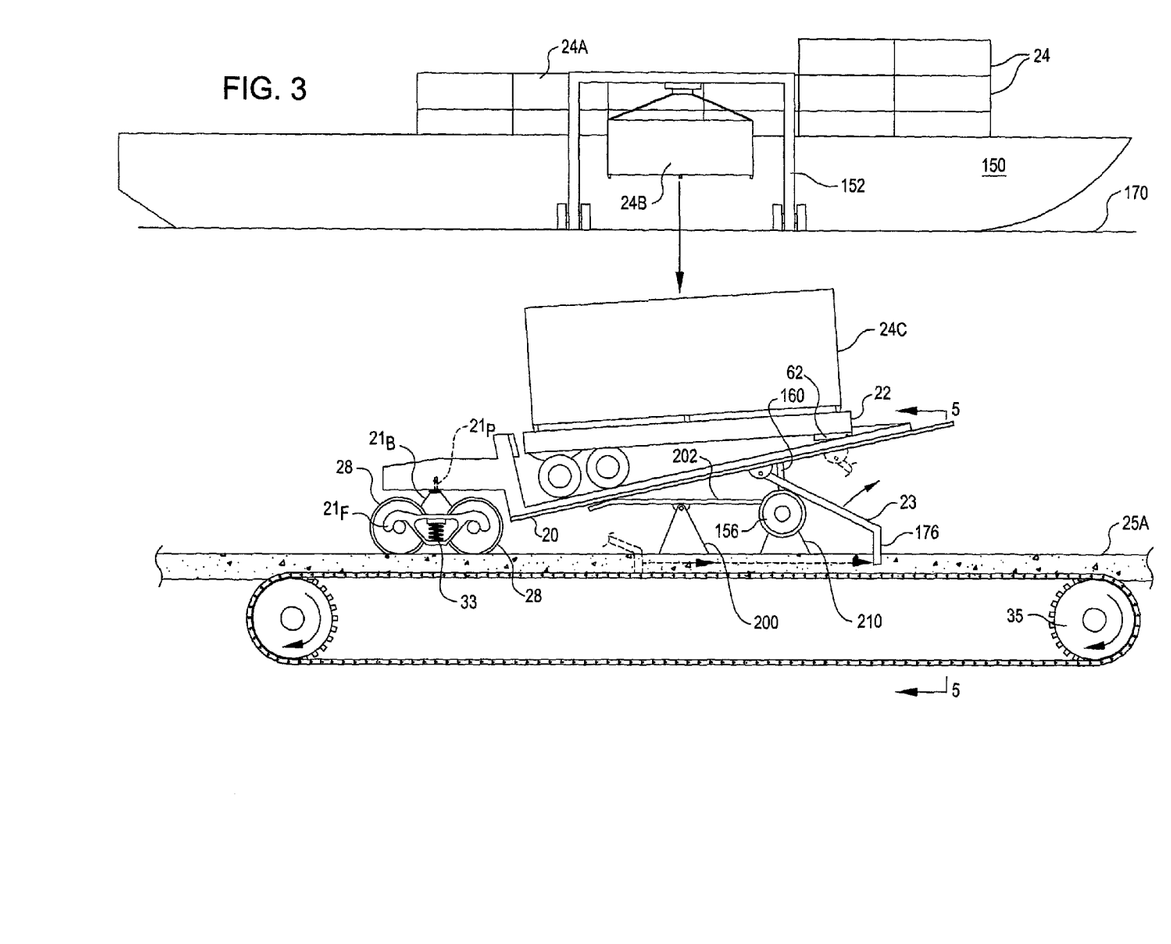

Attention is directed to FIGS. 1, 2, and 3, where a rail car 20 for carriage of over-the-road trailers 22 is depicted. As seen in FIG. 1, a rail car 20 riding on bogie 21 and the pair of auxiliary flanged wheels 156 is being pulled by conveyor hook 23 along on a rail siding 25. Rail siding 25 includes companion spaced-apart rails 25A and 25B. A conveyor system 27 having a drag chain 29 with links 31 with one or more drive wheels 35 is provided, with drag chain 29 disposed between rails 25A and 25B. As also seen in FIG. 1, rail car 20 is shown carrying an over-the-road semi-trailer 22. As further detailed in FIG. 1, the rail car 20 includes a bogie 21 with a chassis operably supporting wheelsets including a pair of axles 26, with each axle 26 provided with a pair of flanged rail wheels 28. The bogie 21 may be provided in any of a number of configurations known to those of skill in the art, for example those which are disclosed at https://en.wikipedia.org./wiki/Bogie, or at https://en.wikipedia.org/wiki/List_of_railroad_truck_
parts#/media/File:Railroad_truck,FM55-20.Fig8-8.png. In various configurations, the bogie 21 may be provided with a suspension package 30 which may include conventional components such as springs 33 to absorb the shocks between the bogie chassis or frame $21_F$ and the body $20_B$ of rail car 20. Springs 33 may be located between a spring plank and a bolster (not detailed) in a conventional fashion as will be known to those of skill in the art and to whom this disclosure is directed. Plates, including a center plate (not detailed) rotatably engage to allow the rail car 20 to freely pivot on bogie 21, around a center pivot pin $21_P$ which may pass through a center plate on the bolster $21_B$.

Figure 6:
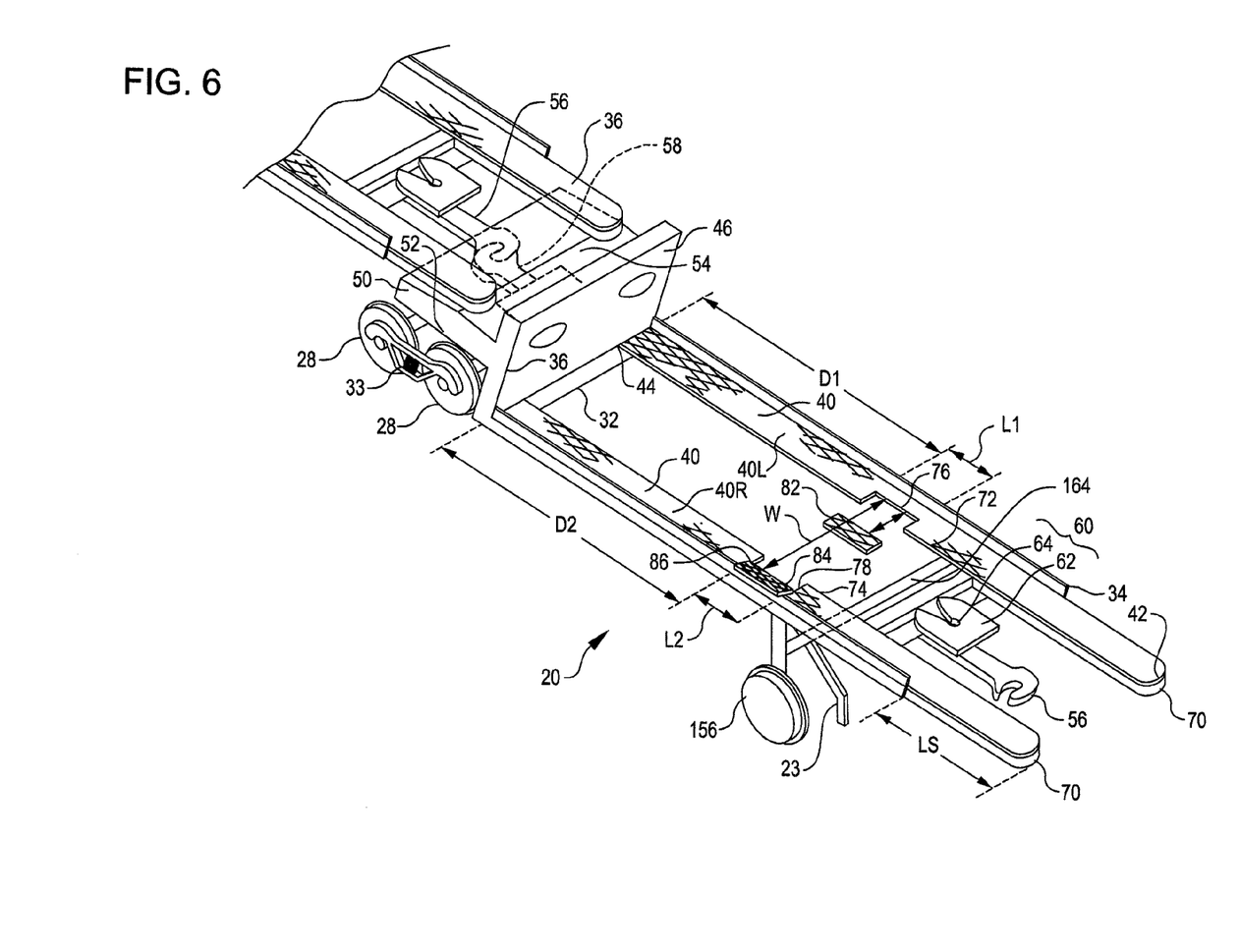
FIG. 6 shows details for embodiment an L-car useful for rail travel of rail-road intermodal freight, here illustrating the use of a coupling between a first L-car and a second L-car, as well as showing the deck for supporting a trailer, and the guide wheels on the L-car which support the forward end of individual L-cars when traversing the rail siding above the conveyor system.
Figure 8:
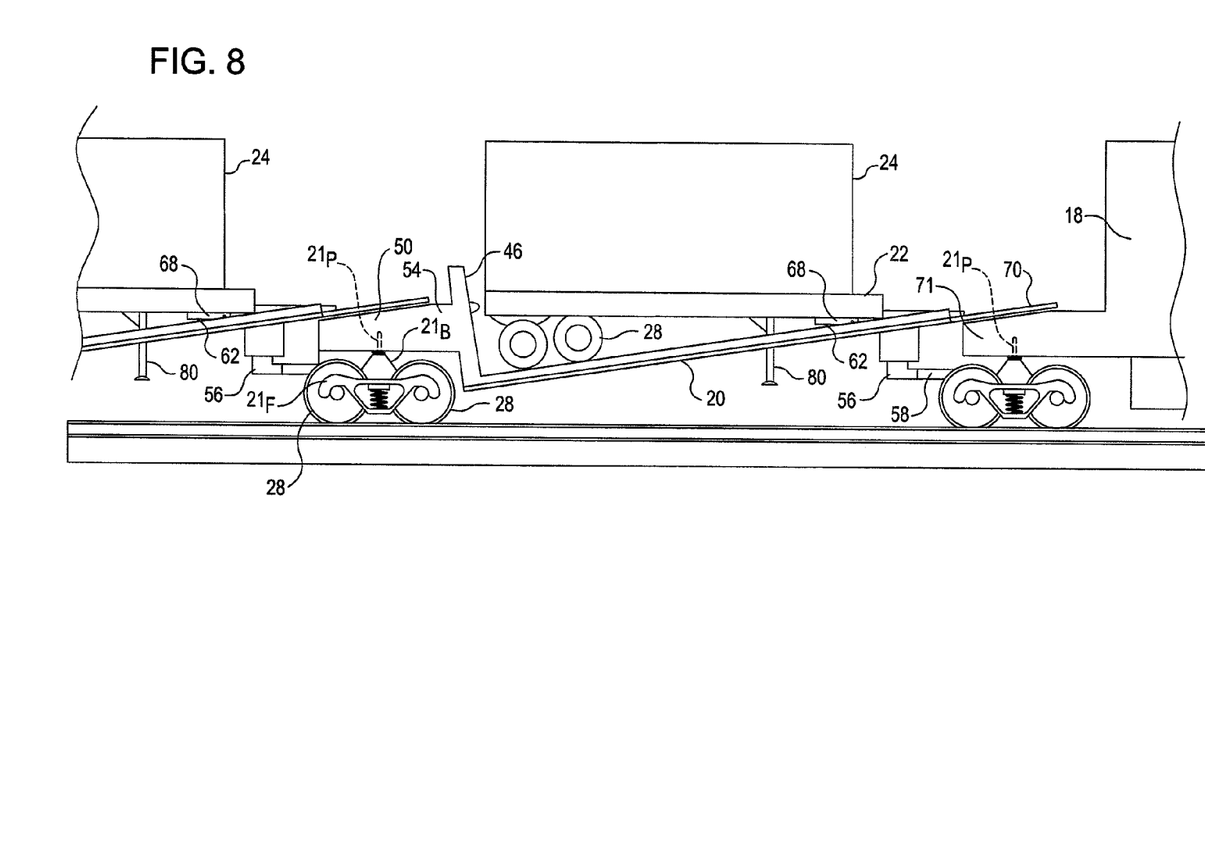
FIG. 8 shows details for embodiment an L-car system for rail travel of rail-road intermodal freight, here illustrating the use of a dolly at a first L-car (N=1) on a train T or train portion TP made up of a number N of L-cars, where the dolly supports a first L-car for connection to a locomotive (or alternately to another train portion TP), and thence where a second L-car (N=2) is joined by coupling to the first L-car (N=1).

As better seen in FIG. 6, a frame 32 is provided for rail car 20, wherein the frame 32 is generally L-shaped, with a frame front end 34 and a frame rear end 36. The frame further includes a deck 40 for support of a trailer 22. The deck 40 may extend between a deck first end 42 and a deck second end 44. In an embodiment, a deck 40 may be adapted to slope downward toward a second end 44 during rail transit operation. In an embodiment, a generally vertically extending bumper 46 may be located at or adjacent the second end 44 of the deck 40. A rear base 50 may be provided, located rearward of the bumper 46. In an embodiment, a rear base 50 may have (a) a lower side 52 resting on and suspended by bogie 21 as described above, and (b) and an upper side 54. As seen in FIG. 8, in an embodiment a conventional railroad front coupler 56 and rear coupler 58 may be provided. In various embodiments, a hitch 60 may be provided, in order to secure a trailer 22 to the rail car 20. Trailer 22 in turn supports container 24.

Figure 10:
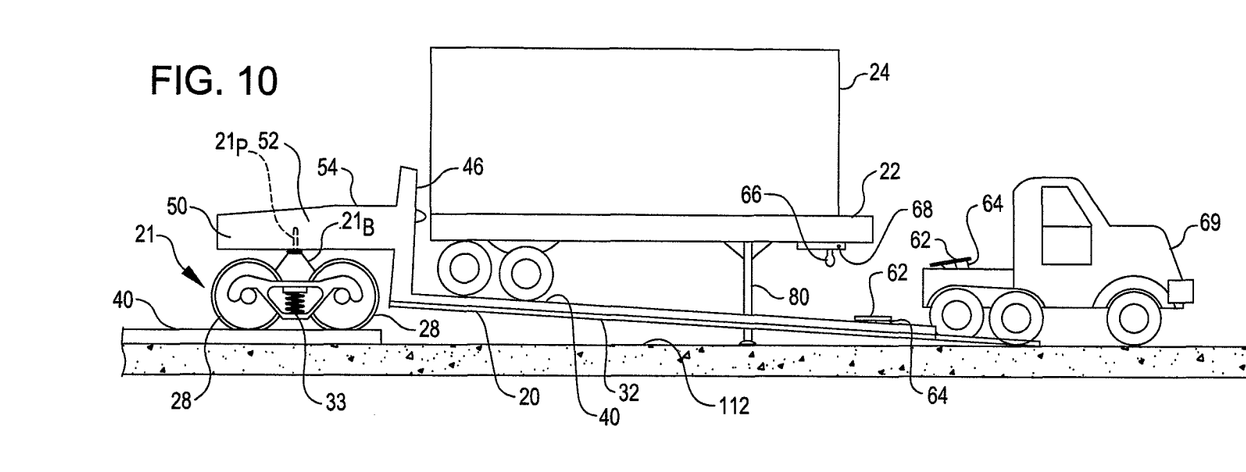
FIG. 10 shows yet further details for an embodiment of a L-car for use in transport of over-the-road trailers, now illustrating the pick-up of an over-the-road trailer by a tractor, with the L-car in its lowered, trailer pickup position.

As may be further understood with reference to FIG. 6, and as described elsewhere herein, in an embodiment, a hitch 60 may include a fifth wheel sliding plate 62 with spring loaded clamping jaws 64 that act on a king pin 66 located at an upper mating plate 68 on semi-trailer 22, all of which are adapted to lock the king pin 66 to secure the semi-trailer 22. As seen in FIG. 10, a tractor 69 adapted to pull trailer 22 may be similarly equipped with fifth wheel type sliding plate 62 and clamping jaws 64, all provided in a conventional manner.

As seen in FIG. 6, in various embodiments, a rail car 20 may be provided with one or more support members 70, sized and shaped and joined with or integrally provided with frame 32, so that the front end 42 of rail car 20 is supported. Such support members 70 may extend forward of the frame 32, with sufficient length LS sufficient to reach an upper side 54 of a rear base 50 of a next forward rail car 20 in a set of N rail cars, wherein N is a positive integer greater than one. As noted in FIG. 8, at a first rail car 20, the support members 70 may rest on a connecting dolly 71, which provides for attachment to engine 18. In an embodiment, two support members 70 may be provided.

As also seen in FIG. 6, a deck 40 may include a left track portion 40L and a right track portion 40R. The left 40L and right 40R track portions are sized and shaped for support of a trailer 20 having conventional dual left wheels (not shown) and dual right wheels 73. The dual right wheels 73 are seen in various figures. See, for example, FIG. 1 for the dual right wheels 73; the dual left wheels would appear substantially similar. As used herein, dual wheels refers to the use of two wheels on one side of an axle, and two wheels on the opposite side of the same axle, for a total of four wheels on the single axle. However, it should be understood that with respect to wheel width requirements on the frame, use of a single outset wheel or a single inset wheel in lieu of dual wheels on a side of an axle should be considered functionally equivalent and within the scope of the term dual wheels as set out in herein. Further, the tandem axle trailers illustrated herein have sets of dual wheels, with one set of dual wheels on each side of each of the two axles.

As also may be appreciated from FIG. 6, the left track portion 40L has a first inner edge 72, and the right track portion has a second inner edge 74. The first inner edge 72 and the second inner edge 74 define a gap between the left track portion 40L and the right track portion 40R. In some embodiments, a rail car 20 may be further configured for transport of a semi-trailer having landing gear. In such cases, the first inner edge 72 further comprises a first outwardly protruding cutout 76 a distance D1 forward from the bumper 46 that defines a narrowed length L1 of the left track portion 40L. Also, the second inner edge 74 further comprises a second outwardly protruding cutout 78 a distance D2 forward from the bumper 46 that defines a narrowed length L2 of the right track portion 40R. The first outwardly protruding cutout 76 and the second outwardly protruding cutout 78 may be sized and shaped to provide sufficient width W for passage through said deck of landing gear 80 of a selected semi-trailer. In an embodiment, the rail car 20 may be further provided with a first deck insert 82 corresponding to the size and shape of the first outwardly protruding cutout 76, and a second deck insert 84 corresponding to the size and shape of said second outwardly protruding cutout 78. In an embodiment, a first deck insert 82 may be hinged to the left track portion (not shown, but similar to below), and the said second deck insert 84 may be hinged at hinge 86 to the right track portion 40R.

Turning now to FIGS. 1, 2, 3, 5, and 7, various aspects of components for an integrated ship-to-rail-to-road intermodal container loading apparatus are illustrated, as well as various steps in implementing a method for their use. Rail car 20 for carriage of over-the-road trailers 22 is depicted being pulled along a railway 25 by way of conveyor hook 23 being pulled by drag chain 29 of conveyor system 27. The over-the-road trailer 22 is ready to receive a container 24, as indicated in FIG. 3 by way of removal of container 24A from ship 150 by crane 152, then by movement to location indicated by container 24B, and thence by movement to the location indicated by container 24C. As further detailed in FIG. 1, the rail car 20 includes a bogie 21 having axles 26 connected to a pair of flanged main rail wheels 28, located at or near the rear of the frame 32, and a suspension package 30 which may include conventional springs 33. As better seen in FIG. 5, the flanged rail wheels 28 are configured for transport over a conventional pair of first $25_A$ and second $25_B$ rails. A pair of flanged auxiliary rail wheels 156 and 158 are provided at a location forward of the flanged main rail wheels 28. Each of the pair of flanged auxiliary rail wheels 156 and 158 are disposed downwardly from the frame 32 by opposing first gear leg strut 160 and second gear leg strut 162. The opposing first gear leg strut 160 and second gear leg strut 162 are spaced apart by a cross-brace 164. Rail car 20 is provided with a conveyor hook 23. The conveyor hook 23 extends below the frame 32. The conveyor hook 23 includes an arm 170 with a proximal end 172 pivotally affixed to the frame 32 at pivot 174. The conveyor hook arm has a downwardly extending hook 178 which extends downward to a distal end 176 thereof.

Figure 4:
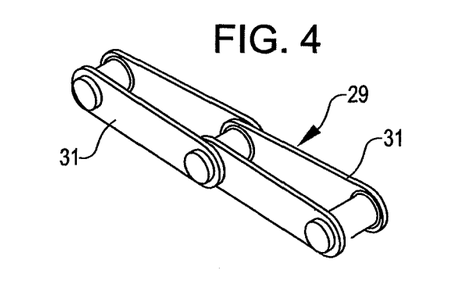
FIG. 4 shows an exemplary embodiment for drag chain elements for use in a conveyor system which may be placed at a wharf for movement of rail cars for loading of containers from a ship to an over-the-road trailer which is located on a rail car.

As seen in FIG. 1, a conveyor system 27 is provided as noted above, having a drag chain 29 with a plurality of chain links 31. Also see details in FIG. 4. Returning to FIG. 1, at least one driving wheel 35 is provided to drive the drag chain 29. The drag chain has upper portion oriented substantially collinear with a rail siding, represented by rails 25A and 25B as detailed in FIG. 5 and between the rails 25A and 25B in the pair of rails in the rail siding.

As seen in FIG. 3 and noted above, an over-the-road trailer 22 is provided. The over-the-road trailer 22 is sized, shaped, and configured for secure mounting engagement on and to the frame 32, and to the hitch 60. In an embodiment, the rail siding, represented by rails $25_A$ and $25_B$ may be located at or adjacent a wharf 170, which is configured to receive ship 150 bearing shipping containers 24 (e.g., container 24A in FIG. 3). The rail siding represented by rails $25_A$ and $25_B$ is configured for movement of rail cars 20 thereon.

A crane 152 may be adjustably positionable on the wharf 170 for removing shipping containers 24 from a ship 150 and placing them on the over-the-road trailer 22, when the over-the-road trailer 22 is mounted on the rail car 20.

Figure 5:
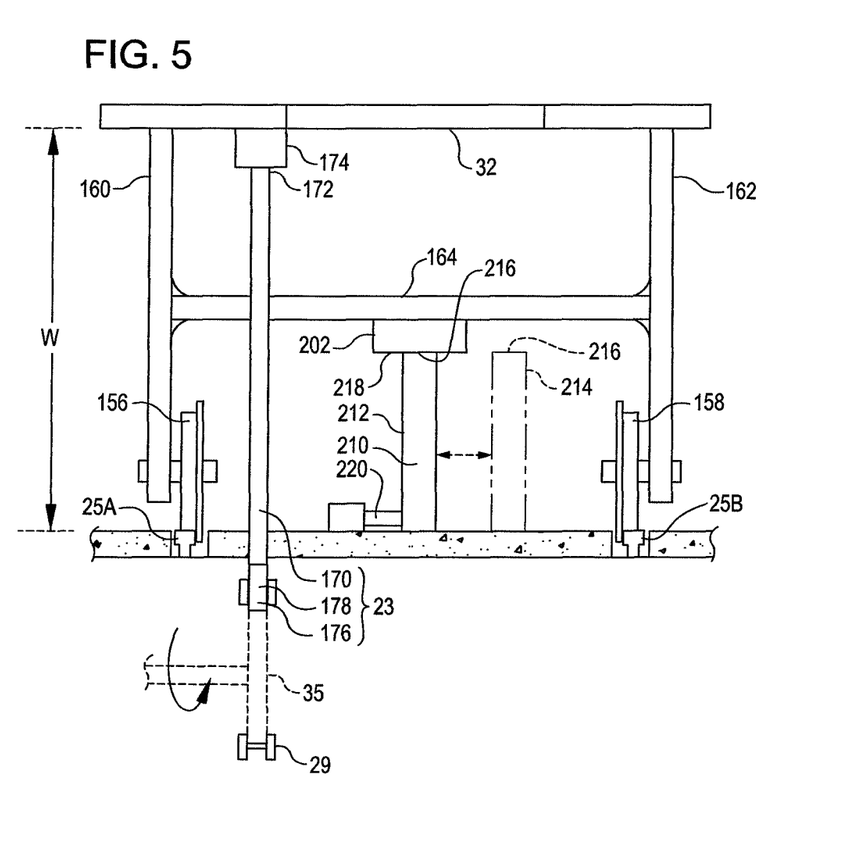
FIG. 5 is a partial vertical cross-sectional view, showing elements of an embodiment for an L-car configuration, showing (a) the guide wheels on the L-car which support the forward end of individual L-cars when traversing the rail siding above the conveyor system, (b) the gear legs for the guide wheels, (c) the cross-brace extending between the gear legs for the guide wheels, (d) the pivot board which is sized and shape for sliding engagement with the cross-brace, and (e) the pivot stop which limits the movement of the pivot board until release, wherein it is moved to the side as indicated in broken lines. Additionally shown is a conveyor hook and conveyor drive wheel and drive shaft (in broken lines).

As more clearly seen in FIGS. 1 and 5, in an embodiment, the innovative system described herein may further include a pivot block 200, and pivotally mounted thereto, a pivot board 202. The pivot board 202 may be preferably oriented collinear with and along and between the pair of rails $25_A$ and $25_B$. The pivot board 202 may have an upper surface 204 adapted for sliding engagement with the cross-brace 164.

Further, in an embodiment, a moveable pivot stop 210 may be provided. The moveable pivot stop 210 may be moveable between a pivot board engaging position 212 (see solid lines in FIG. 5) and a pivot board avoidance position 214 (see broken lines in FIG. 5). The moveable pivot stop 210 includes an upper end 216 adapted to receive a lower side 218 of the pivot board 202, and thereby stop pivotal movement of the pivot board 202 when the pivot stop 210 is in the pivot board engaging position 212.

The moveable pivot stop 210 may further include a pivot stop positioning element 220, oriented to provide force for movement of pivot stop 210, for example, by use of hydraulic or electric drive. As illustrated in FIG. 5, the pivot stop positioning element 220 is adapted to move the pivot stop 210 from a pivot board 202 engaging position 212 to a pivot board avoidance position 214.

As can be seen in FIG. 1, the pivot board 202 may be located at a height H1 above the pair of rails 25A and 25B, wherein the height $H_1$ is sufficient to cause the pivot board 202 to engage and upwardly urge the cross-brace 164 of the rail car 20, as the rail car 20 is advanced toward the pivot block 200 by the conveyor system 27. Note that the moveable pivot stop 210 is located to receive and stop pivotal motion of the pivot board 202, and to thereby raise the conveyor hook 23 sufficiently to thereby disengage the conveyor hook 23 from the drag chain 29 of the conveyor system 27, so as to stop further movement of the rail car 20 by way of the conveyor system 27. Also, note that the flanged auxiliary rail wheels 156 and 158 are spaced a distance W below the frame 32 (i.e., from frame to rolling contact point), so that the flanged auxiliary rail wheels 156 and 158 are raised above the pair of rails 25A and 25B when the cross-brace 164 is engaged by and moved upwardly by the pivot board 202, until conveyer hook 23 is disengaged from the drag chain. At this a downstream end 203 of point pivot board 202 moves downwardly a distance $H_2$ until it comes to rest on the movable pivot stop 210. At this point, a shipping container 24 may be easily loaded on to trailer 22.

Figure 7:
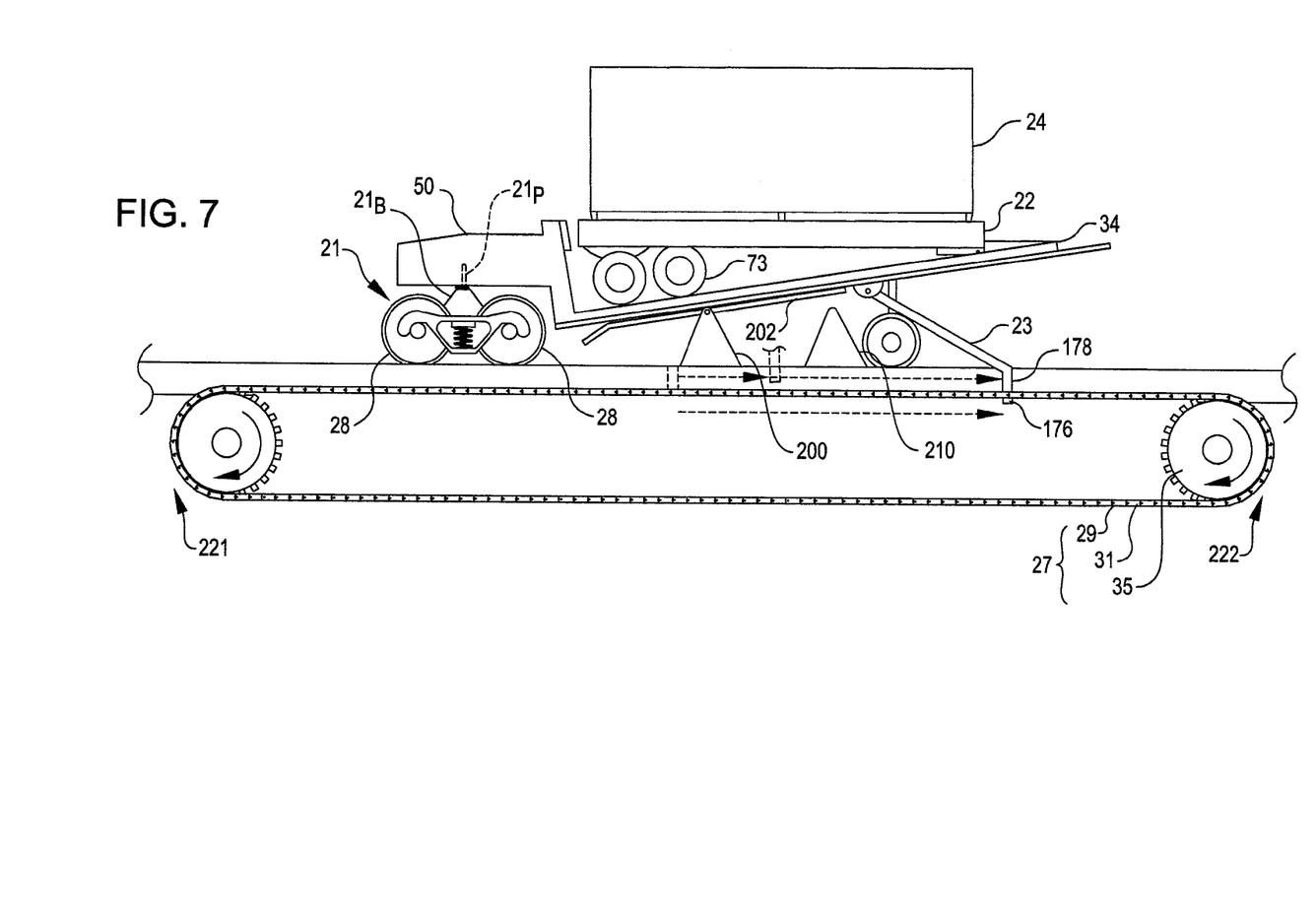
FIG. 7 shows a portion of a conveyor system and accompanying rail siding which may be placed along a wharf for transfer of containers from a ship to an over-the-road trailer which is located on a rail car, and wherein the trailer has received a shipping container, and the conveyor hook extending from the rail car has been lowered by removal a pivot stop, allowing the conveyor hook to engage the drag chain conveyor and thus pulling the rail car and the loaded trailer thereon forward.

When loading of trailer 22 is complete, as can be appreciated from FIGS. 5 and 7, the moveable pivot stop 210 may moved by the pivot stop positioning element 220. The pivot stop positioning element 220 is adapted to move the pivot stop 210 from a pivot board engaging position 212 to a pivot board avoidance position 214. This movement releases the conveyor hook 23 to reengage the drag chain 27, and thus, rail car 20 is moved along away from first end 221 and toward the second end 222 of conveyor system 27.

The apparatus described above is expected to be useful in reducing the time and labor requirements for loading shipping containers 24 on to trailers 22 utilized in intermodal ship-to-rail-to road shipments. First, a plurality of rail cars 20 are provided. Then, a plurality of over-the-road trailers 22 are provided. The over-the-road trailers are configured for receiving and securely transporting shipping containers 24. A first rail siding is provided located adjacent a source of shipping containers 24. In an embodiment, a first rail siding may be located on a wharf 170, and in such case, the source of shipping containers 24 may be a ship 150. The first rail siding includes a pair of rails 25A and 25B. An over-the-road trailer 22 is affixed to a selected rail car 20. A conveyor system 27 provided. Such conveyor system 27 includes a first 221 and a second 222 end, and a drag chain 29 for moving rail cars 20 from the first end 221 to the second end 222. A selected rail car 20 is moved to a loading position adjacent the source of shipping containers by engaging a conveyor hook 23 on the rail car 20 to the drag chain 29. When appropriately positioned, the conveyor hook 23 is disengaged from the drag chain 29 to halt movement of the rail car 20. A selected shipping container 24A from the source of shipping containers is secured and lifted by a crane 152, and then lowered and mounted to an over-the-road trailer 22 on one of the plurality of rail cars 20. Subsequently, the conveyor hook 23 is reengaged with the drag chain 29 to move the rail car 20 to the second end 222 of said conveyor system 27.

In an embodiment of the method, as seen in FIG. 8, at the end of the conveyor system 27 a train assembly area is provided, where a first one of a selected plurality of rail cars 20 is connected to dolly 71. In a variation and refinement of the method, the source of shipping containers may be organized by destination, and in such cases, shipping containers 24 may be loaded to rail cars 20 in groups by destination. In an embodiment, a group of rail cars 20 in a selected plurality of rail cars 20 may be provided with a separate dolly 71 for each destination, to facilitate separation at distribution yards after transshipment on main railroad lines is complete.

In an embodiment, the method may include the step of disengaging the conveyor hook 23 from said drag chain 29 by way of lifting a cross-brace 164 on a rail car 20 sufficiently so as to disengage the conveyor hook 23 from the drag chain 29. In such an embodiment, during the step of mounting the selected shipping container 24 to an over-the-road trailer 22 on one of the plurality of rail cars 20, the cross-brace 164 is supported a height above the pair of rails $25_A$ and $25_B$ sufficient to allow the drag chain 29 to move without engaging the conveyor hook 23. In this situation, the upward movement of the cross-brace 164 is provided by a pivot board 202, and during the step of mounting the selected shipping container 24 to an over-the-road trailer 22 on one of the plurality of rail cars 20, the cross-brace 164 is supported a height above the pair of rails $25_A$ and $25_B$ by a pivot stop 210, as seen in FIG. 5.

After loading of the shipping container 24 on the over-the-road trailer 22, the pivot stop 210 is moved so as to remove support for the cross-brace 164, to thereby allow the conveyor hook 23 to reengage the drag chain 29.

Figure 9:
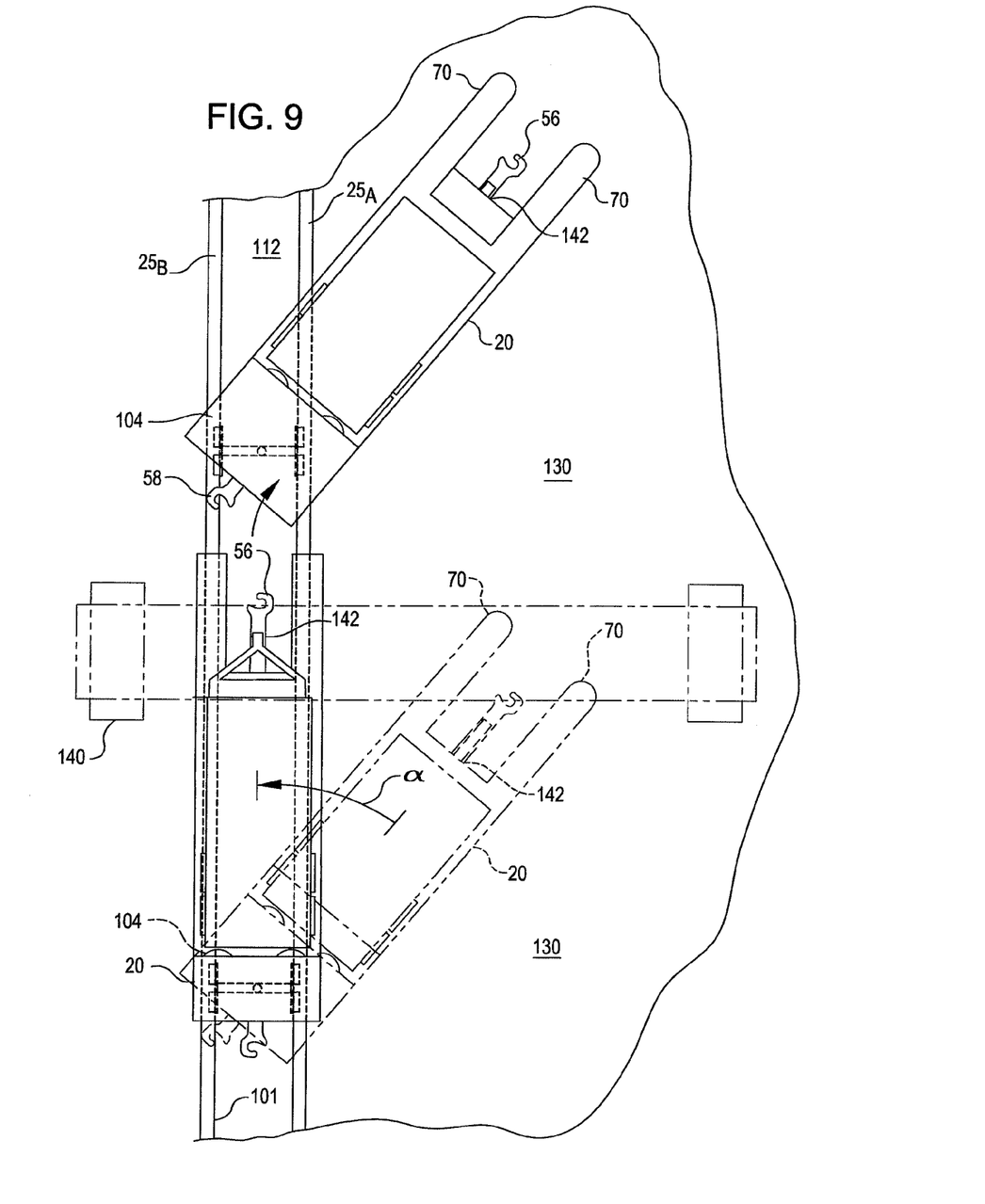
FIG. 9 shows yet further details for an embodiment of a rail siding as at a time during which L-cars in a railroad train are being turned for pickup of the over-the-road trailers by an over-the-road tractor, for removal from the rail yard; and shown here are additional details involving the use of novel rail sections, and interchangeable rail discs, all of which facilitates the angular movement of an L-car to a position for off-load of an over-the-road trailer from the L-car.

Attention is directed to FIG. 9 which shows yet further details for an embodiment of a rail siding as at a time during which rail cars 20 in a railroad train are being turned for pickup of the over-the-road trailers 22 by an over-the-road tractor 69, for removal from the rail yard.

As seen in FIG. 9, when a train including L-car type rail cars 20 arrives at its destination at an intermodal hub location, the rail cars 20 may be pivoted about bogie 21. In such embodiments, the bogie 21 may include a pivot pin $21_P$ as described above which allows rail car 20 to be pivoted with respect the bogie 21, which remains on rails $25_A$ and $25_B$. Thus, the rail car 20 may be turned to an angle alpha ($\alpha$) with respect to the orientation of the rail siding 25.

The L-car type rail cars 20 described herein enable use of a method for rapid loading and unloading of trailers 22 to or from rail cars 20. First, a plurality of rail cars 20 as described herein may be provided. Then, a plurality of over the road trailers, such as trailers 22 are provided. A suitable rail siding must be provided in a rail yard 130 for access by both incoming rail cars and by over-the-road tractors for hookup to individual trailers 22. As can be appreciated by reference to FIG. 9, there must be space in rail yard 130 for storage for the plurality of rail cars 20 when the plurality of rail cars 20 are turned to a spaced apart angled configuration by an angle alpha ($\alpha$), with each rail car 20 spaced apart from adjacent rail cars 20. Importantly, the storage space in rail yard 130 should be accessible as a roadway by tractors 69. As seen in FIG. 9, a lift 140 may be provided. Lift 140 may be of conventional fashion as used for lifting containers, however, lifting requirements in most instances may be considerably less, so energy savings may be possible by using lifting mechanism, such as a wheeled lifting device, more closely matched with actual loads. In any event, lift 140 is used to lift at least one end of each of the rail cars 20, one after the other. To start, a first (N=1) rail car 20 is lifted at or near a front end 142, to turn the rail car 20 and place the rail car at a selected angle alpha($\alpha$) away from a track 100 and 102. Then, the front end 142 of the rail car 20 is lowered to the ground, so that the deck 40 of the rail car 20 is accessible to a tractor 69. Then the trailer 22 is removed from the rail car 20 using the tractor 69.

In the foregoing description, numerous details have been set forth in order to provide a thorough understanding of the disclosed exemplary embodiments for apparatus and method for moving shipping containers, and methods of their use in rail-road intermodal freight systems. However, certain of the described details may not be required in order to provide useful embodiments, or to practice selected or other disclosed embodiments. Further, the description may include, for descriptive purposes, various relative terms such as surface, at, adjacent, proximity, near, on, onto, and the like. Such usage should not be construed as limiting. Terms that are relative only to a point of reference are not meant to be interpreted as absolute limitations, but are instead included in the foregoing description to facilitate understanding of the various aspects of the disclosed embodiments. Various components are described which may be employed alternatively, yet be included in some designs or components for use in a particular situation. Accordingly, the method(s) described herein may be utilized in whole or in part in various discrete operations, in a manner that is most helpful in a particular circumstance. However, the order of description should not be construed as to imply that such alternatives are necessarily order dependent, or that use of various components is necessarily in the alternative. Also, the reader will note that the phrase "in one embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by this invention, and may be embodied in other specific forms without departing from the spirit or essential characteristics thereof. Embodiments presented herein are to be considered in all respects as illustrative and not restrictive or limiting. This disclosure is intended to cover methods and apparatus described herein, and not only structural equivalents thereof, but also equivalent structures. Modifications and variations are possible in light of the above teachings. Therefore, the protection afforded to this invention should be limited only by the claims set forth herein, and the legal equivalents thereof.

The invention claimed is:

1. Apparatus for loading shipping containers on over-the-road trailers at a rail siding including a pair of spaced apart rails configured for movement of rail cars thereon, said apparatus comprising:
   a rail car, said rail car comprising
      a frame, said frame having a front and a rear,
      a bogie having a chassis;
      said frame pivotally supported above said bogie, said bogie comprising at least four flanged main rail wheels and a suspension package between said bogie chassis and said at least four flanged main rail wheels;
      a pair of flanged auxiliary rail wheels, said flanged auxiliary rail wheels located forward of said at least four flanged main rail wheels, and disposed downwardly from said frame by opposing first and second gear leg struts, said first and second gear leg struts spaced apart by a cross-brace, said flanged auxiliary rail wheels configured to support said rail car while traversing a rail siding;
      a conveyor hook, said conveyor hook extending below said frame, said conveyor hook having an arm with a proximal end pivotally affixed to said frame and a distal end with a downwardly extending hook portion extending therefrom;
      extending upward from said frame, a hitch, said hitch comprising a steel mating plate and clamping jaws, said clamping jaws adapted to lock thereto a king pin extending downward from an over-the-road trailer.

2. The apparatus as set forth in claim 1, further comprising:
   a conveyor system, said conveyor system comprising a drag chain and at least one driving wheel which powers said drag chain, said drag chain comprising an upper portion and a lower portion, said upper portion oriented substantially collinear with said rail siding and between said pair of rails.

3. The apparatus as set forth in claim 2, wherein said drag chain comprises a plurality of links, said links sized and shaped for receiving therein said conveyor hook extending below said frame of said rail car.

4. The apparatus as set forth in claim 2, further comprising:
   (a) a pivot and a pivot board, said pivot board pivotally mounted to said pivot, said pivot board oriented along and between said pair of rails, said pivot board having an upper surface adapted for sliding engagement with said cross-brace; and
   (b) a moveable pivot stop, said moveable pivot stop having a pivot board engaging position and a pivot board avoidance position, said pivot stop having an upper end adapted to receive a lower side of said pivot board and thereby stop pivotal movement of said pivot board when said pivot stop is in said pivot board engaging position.

5. The apparatus as set forth in claim 4, wherein said moveable pivot stop further comprises a pivot stop positioning element, and wherein said pivot stop positioning element is adapted to move said pivot stop from said pivot board engaging position to said pivot board avoidance position.

6. The apparatus as set forth in claim 4, wherein said pivot board is located at a height H1 above said pair of rails, said height H1 sufficient to cause said pivot board to engage and upwardly urge said cross-brace of said rail car, as said rail car is advanced toward said pivot by said conveyor system.

7. The apparatus as set forth in claim 6, wherein said pivot stop is located to receive and stop pivotal motion of said pivot board, and whereby said conveyor hook is raised sufficiently to disengage said conveyor hook from said drag chain of said conveyor system, so as to stop further movement of said rail car by way of said conveyor system.

8. The apparatus as set forth in claim 7, wherein said flanged auxiliary rail wheels are spaced a distance W below said frame, so that said flanged auxiliary rail wheels are raised above said pair of rails when said cross-brace is engaged by said pivot board.

9. The apparatus as set forth in claim 1, further comprising over-the-road trailers,
   wherein said apparatus further comprises an over-the-road trailer, said over-the-road trailer sized, shaped, and configured for secure mounting engagement on said frame and to said hitch;
   wherein said rail siding is located adjacent a wharf adapted to receive a ship transporting shipping containers; and
   wherein said apparatus further comprises a crane, said crane adjustably positionable on the wharf for removing shipping containers one at a time from the ship and placing them on said over-the-road trailers, when said over-the-road trailers are mounted on said rail car.

* * * * *